Feb. 23, 1971     E. H. MILLER     3,565,497

TURBOCHARGER SEAL ASSEMBLY

Filed May 23, 1969     2 Sheets-Sheet 2

INVENTORS
ELBERT H. MILLER

BY

ATTORNEYS

United States Patent Office 3,565,497
Patented Feb. 23, 1971

3,565,497
TURBOCHARGER SEAL ASSEMBLY
Elbert H. Miller, East Peoria, Ill., assignor to Caterpillar Tractor Co., Peoria, Ill., a corporation of California
Filed May 23, 1969, Ser. No. 827,301
Int. Cl. F16c 1/24
U.S. Cl. 308—36.1          10 Claims

ABSTRACT OF THE DISCLOSURE

A seal assembly suitable for combination with a turbocharger having a housing defining a turbine chamber and a shaft rotatably penetrating the housing to support a turbine rotor therein. Two annular grooves are formed in the shaft and an adjacent portion of the housing in radially opposed relation with a split seal ring arranged within both of the grooves. One of the grooves is a restraining groove for limiting axial movement of the seal ring. The other groove is axially wider than the restraining groove with means associated between the housing and shaft to limit relative axial movement therebetween and maintain axial spacing between the seal ring and both axial sides of the other groove.

The present invention relates to a seal assembly suitable for use in a turbocharger to provide a fluid seal between a housing and a shaft which rotatably penetrates the housing to support a turbine rotor within a turbine chamber. The provision of a seal ring and means for positioning the ring within such an environment is made difficult because of the relatively high pressures in the turbine chamber and foreign material which tends to be present within the turbine chamber. Prior art seal assemblies employed within such environments generally include a seal ring or sealing member maintained in engagement with a relatively rotating surface to provide a seal for fluid in the turbine chamber. Either the seal ring or opposing surface is generally free for at least limited axial movement so that either a surface of the ring or a portion of the opposing surface tending to be eroded or worn away. This in turn often leads to undesirable leakage across the seal and may necessitate frequent replacement of various portions of the seal assembly. Erosion of the sealing surfaces is made more serious since the turbine chamber is commonly filled with exhaust gases under pressure tending to deposit foreign materials, such as carbon, upon the surfaces of the chamber. Deposition of these materials may lead to carbon build-up on either the surfaces of the seal ring or on the opposing seal surface and commonly causes accelerated erosion of the seal surfaces.

Accordingly, it is an object of the present invention to provide a seal assembly for combination with machinery such as a turbocharger which affords effective rotary sealing while minimizing or eliminating one or more problems of the type described above.

It is a further object of the present invention to provide a seal assembly wherein a seal ring is arranged within relatively rotating and radially opposed grooves with one of the grooves being axially wider than the other and including means for preventing axial engagement between the seal ring and the axial sides of the wider groove.

Within an arrangement of the type described above, it is also contemplated that a member forming one of the grooves is comprised of axially separable portions to permit installation of the seal ring within the two grooves.

Apparatus for fulfilling the above objects and advantages is described and additional objects and advantages of the present invention are made apparent in the following description having reference to the accompanying drawings.

Figure 1:
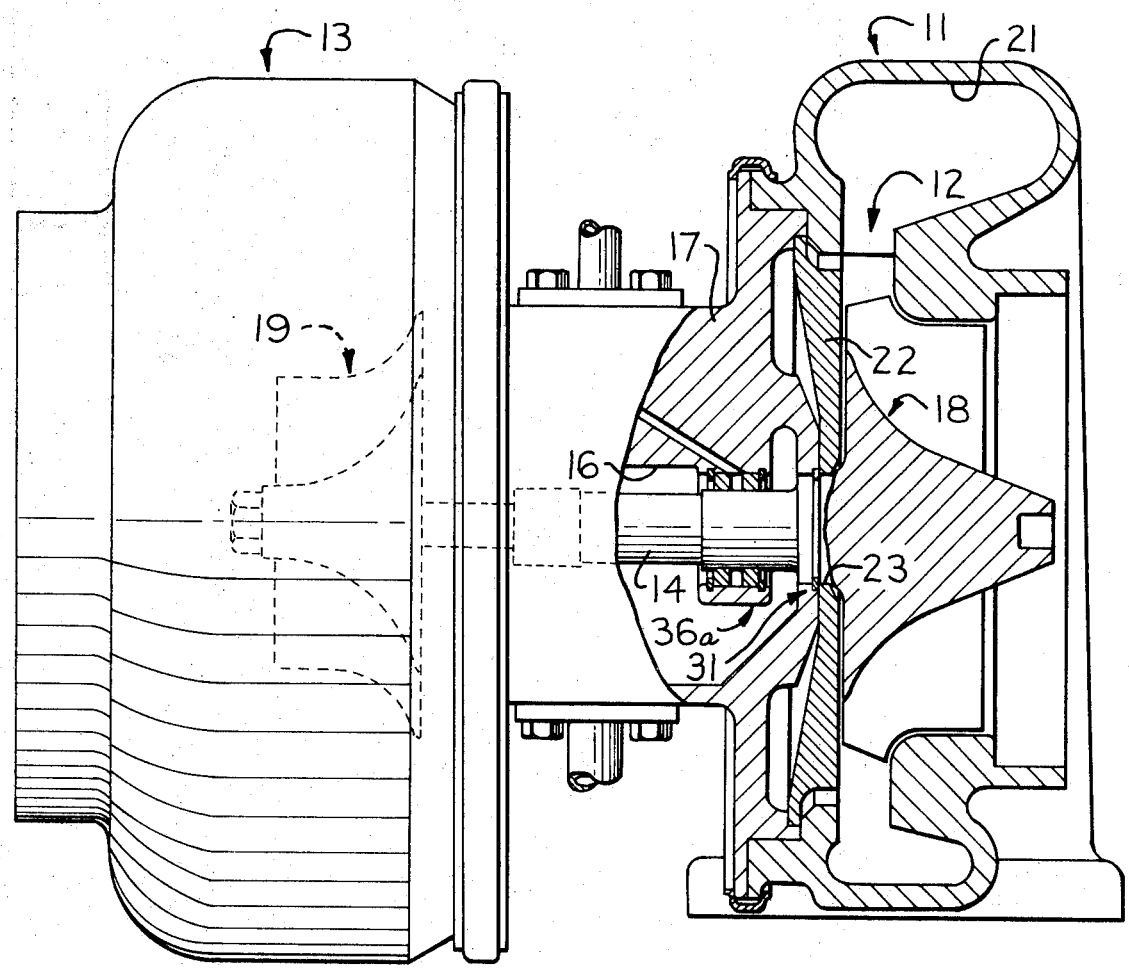
FIG. 1 is a partially sectioned view of a turbocharger as a preferred environment with which the seal assembly of the present invention may be combined.

The seal assembly of the present invention is described below in combination with a machine such as the turbocharger illustrated in FIG. 1. The turbocharger includes a housing 11 separately forming a turbine chamber 12 and a compressor chamber enclosed by a portion 13 of the housing. A shaft 14 is rotatably supported within a cylindrical bore 16 formed by a central portion 17 of the turbocharger housing. The shaft 14 supports at one end a turbine rotor 18 which is rotatably arranged within the turbine chamber 12. The other end of the shaft 14 supports a compressor rotor 19 which is arranged for rotation within the compressor housing 13.

As is conventional for turbochargers of this type, fluids such as hot exhaust gases are delivered under pressure to the turbine chamber 12 through a manifold 21 for driving the turbine rotor 18. The rotating turbine rotor 18 acts in turn through the shaft 14 to rotate the other rotor 19 to compress air in a manner conventionally contemplated for turbocharged engines or other similar machinery (not shown).

As is also conventional in such machinery, an annular heat shield 22 is secured to the central housing portion 17 adjacent the turbine chamber 12. The shield 22 has a bore 23 forming an extension of the bore 16 to permit effective interconnection between the turbine rotor 18 and the compressor rotor 19.

Figure 2:
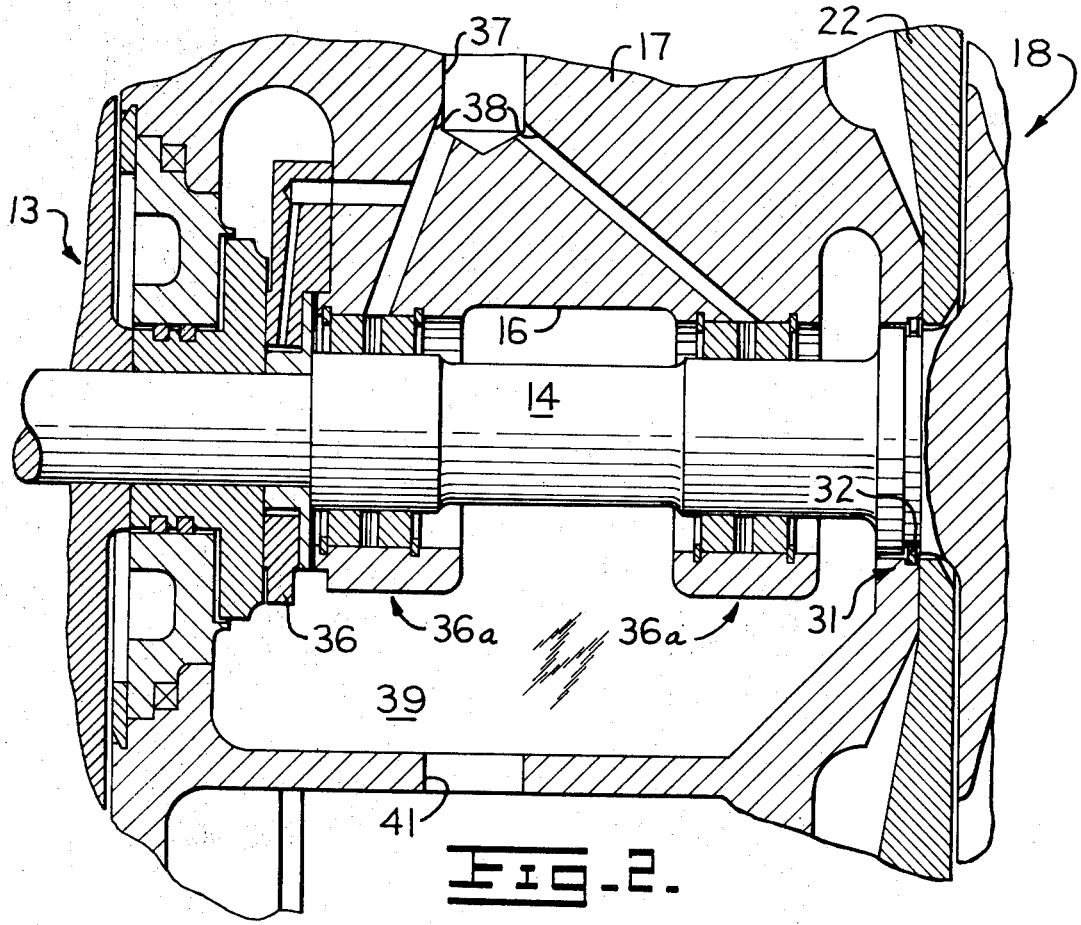
FIG. 2 is an enlarged, fragmentary view taken from FIG. 1 to better illustrate the seal assembly of the present invention.

The particular problem contemplated by the present invention is the provision of a seal assembly for substantially preventing fluid under pressure in the turbine chamber 12 from penetrating between the shaft and housing 17. An embodiment of the present seal assembly for overcoming this problem may be best seen having reference to FIGS. 2–4.

The seal assembly is generally indicated at 31 and includes an annular seal ring 32 of split construction.

Figure 3:
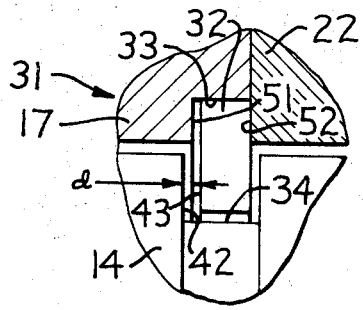
FIGS. 3 and 4 are fragmentary views of the seal assembly employed within the machinery of FIGS. 1 and 2 to better illustrate its construction and manner of operation.
Figure 4:
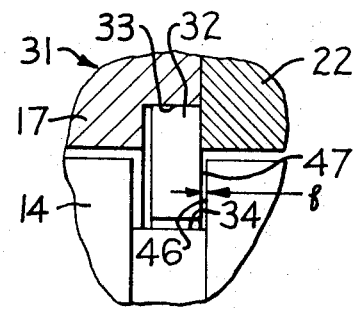

Referring particularly to FIGS. 3 and 4, the seal ring 32 is arranged within radially opposed, annular grooves 33 and 34 formed in generally axial alignment by the turbocharger housing and rotatable shaft 14 respectively.

One of the grooves, for example that indicated at 33, is characterized as a restraining groove for limiting axial movement of the seal ring 32. The other groove, for example that indicated at 34, is axially wider than the restraining groove 33 and permits the seal ring to be maintained in axially spaced apart relation therefrom in a manner more fully described below.

The split seal ring 32 resiliently tends to seat in radial relation with one of the grooves, preferably the restraining groove indicated at 33. Since the housing 11 is stationary, the seal ring 32 accordingly tends to be held in a stationary position within the groove 33 while the shaft 14 and other groove 34 rotate in relation with the seal ring 32 and housing during operation of the turbocharger. The seal ring 32 has a radial dimension which is slightly less than the combined radial depth of the two grooves 33 and 34 as is most clearly shown in FIGS. 3 and 4. Since the seal ring 32 tends to seat with respect to the groove 33, it is also maintained in slight radially spaced apart relation from the groove 34 so that a labyrinth type seal is provided in combination by the real ring 32 and groove 34 in the shaft 14.

Relative axial alignment of the two grooves 33, 34, and accordingly axial spacing between the seal ring 32 and groove 34, as referred to above, is provided by thrust bearing assembly 36 which limits axial movement of the shaft 14 rotatably supported within housing portion 17 by bearing assemblies 36a. Lubricating fluid for the bearings 36 and 36a is provided by means of an inlet port 37 and internal passages 38 formed within the central housing portion 17. Lubricating fluid exits the bearings 36 and 36a into a cavity 39 formed with the housing portion 17 from where it drains through an outlet port 41.

The manner in which the thrust bearings 36 prevent engagement between the seal ring and the wider groove 34 may be better seen by referring also to FIG. 1. Fluid under pressure within the turbine chamber 12 tends to shift the turbine rotor 18 and accordingly the shaft 14 in a leftwardly direction as viewed in FIG. 1. Fluid under pressure within the chamber 12 also acts on the seal ring 32 tending to shift it in a leftwardly direction as viewed in the drawings. Leftward shifting of the shaft 14 within the turbocharger housing or leftward shifting of the seal ring 32 may tend to cause undesirable engagement between the sealing surfaces of the ring 32 and the groove 34. The relative widths of the two grooves 33, 34 and the thrust bearing 36 act in combination to prevent such undesirable engagement.

For example, referring particularly to FIG. 3, if the seal ring 32 is shifted fully to the left within the restraining groove 33, axial alignment of the grooves 33, 34 as controlled by the thrust bearings 36 maintains an axial spacing, indicated at $d$, between the left axial side 42 of the groove 34 and the left annular face 43 of the seal ring 32.

Conversely, if the seal ring 32 remains in a rightwardly disposed position within the groove 33, relative leftward movement of the shaft 14 and wider groove 34 is limited by the thrust bearings 36 so that a minimum gap, indicated at $f$, is maintained between the axial side 46 of the groove 34 and the right annular face 47 of the seal ring 32. Thus, all surfaces of the seal ring 32 are maintained in minimum spaced apart relation from surfaces of the groove 34 so that the combination of the seal ring 32 with the groove 34 and in further combination with the spaced apart shaft 14 and housing portion 17, 22 form a labyrinth seal tending to prevent fluids under pressure in the turbine chamber 12 from penetrating between the shaft 14 and housing bore 16.

In order to permit installation of the seal ring 32 into the two grooves 33, 34, the member forming one of the gooves is comprised of axially separable portion. Referring particularly to FIGS. 3 and 4, the restraining groove 33 is shown as being formed by a counterbore 51 in the housing portion 17 and an adjacent facing surface 52 of the heat shield 22. Thus, the seal assembly may be assembled by inserting the shaft 14 through the heat shield 22 and placing the seal ring within the groove 34 on the shaft. The shaft 14 is then inserted through the bore 16 where it is supported by the bearings 36a. The turbine and compressor rotors may then be secured to opposite ends of the shaft and the remaining portion of the turbocharger assembled in place.

What is claimed is:

1. A seal assembly in turbine machinery having a housing defining a turbine chamber and a turbine rotatably supported therein upon a shaft rotatably mounted in a cylindrical bore formed by the housing, the seal assembly providing a seal between the shaft and housing for pressurized fluids in the turbine chamber, comprising two generally axially aligned annular grooves formed on an inner cylindrical surface of the housing and an outer cylindrical surface of the shaft respectively, a split seal ring arranged within the radially opposed grooves, the ring having a radial dimension less than the combined radial dimension of the two grooves, a first one of the grooves being a restraining groove for limiting axial movement of the ring, the second groove being of axially wider dimension than the restraining groove, a selected one of the grooves being formed by two separate members to permit installation of the seal ring, and means associated with the housing and shaft to limit relative axial movement therebetween and maintain axial spacing between the seal ring and both axial sides of the second groove, the ring resiliently tending to seat in the restraining groove so that the ring is maintained in spaced apart relation with the surfaces of the second groove to form a labyrinth seal.

2. The invention of claim 1 wherein the limiting means comprises thrust bearing means arranged between the shaft and housing.

3. The invention of claim 1 wherein the machine is a turbocharger and the penetrating end of the shaft is secured to a compressor rotor.

4. The invention of claim 1 wherein the restraining groove is formed by two axially separable portions of the housing.

5. The invention of claim 4 wherein the machine is a turbocharger also including a compressor chamber, the penetrating end of the shaft being secured to a compressor rotor within the compressor chamber, the restraining groove being formed by one portion of the housing separating the two chambers and another portion of the housing providing a heat shield adjacent the turbine chamber.

6. The invention of claim 5 wherein the restraining groove is formed by a counterbore in the one housing portion and an adjacent, radial face surface of the other housing portion.

7. The invention of claim 6 wherein the limiting means comprises thrust bearing means arranged between the shaft and housing.

8. A seal assembly in combination with a housing defining a chamber for receiving fluid under pressure and a shaft rotatably mounted in a cylindrical bore formed by the housing in communication with the chamber, the seal assembly providing a fluid seal between the shaft and housing adjacent the chamber, the seal assembly including two generally axially aligned annular grooves formed in radially opposed relation on an inner cylindrical surface of the housing and an outer cylindrical surface of the shaft respectively, one of the grooves being a restraining groove, the other groove being of axially wider dimension than the restraining groove, a selected one of the grooves being formed by two axially separable members, a split seal ring arranged within the radially opposed grooves, the ring having a radial dimension less than the combined radial dimension of the two grooves, the ring resiliently tending to seat in radial relation with the restraining groove, and means associated with the housing and shaft for limiting relative axial movement therebetween and maintaining axial spacing between the seal ring and both axial sides of the other groove, the seal ring being thereby maintained in at least slightly spaced apart relation with all portions of the other groove and cooperating therewith to form a labyrinth seal.

9. The invention of claim 8 wherein the restraining groove is formed by two axially separable portions of the housing.

10. The invention of claim 8 wherein the limiting means comprises thrust bearing means arranged between the shaft and housing.

References Cited

UNITED STATES PATENTS

| | | | |
|---|---|---|---|
| 775,910 | 11/1904 | Backstrom | 308—36.1 |
| 2,823,058 | 2/1958 | Ecker et al. | 277—173 |
| 3,104,918 | 9/1963 | Horan, Jr., et al. | 308—36.1 |
| 3,162,451 | 12/1964 | Brose | 277—53 |
| 3,273,906 | 9/1966 | Pennington | 277—53 |
| 3,396,976 | 8/1968 | Reinhoudt et al. | 277—173 |
| 3,494,679 | 2/1970 | Burdette | 308—36.1 |

FOREIGN PATENTS

| | | | |
|---|---|---|---|
| 1,204,064 | 10/1965 | Germany | 308—36.1 |

FRED C. MATTERN, Jr., Primary Examiner

W. S. RATLIFF, Jr., Assistant Examiner

U.S. Cl. X.R.

277—53